(12) United States Patent
Shirley

(10) Patent No.: US 7,261,763 B2
(45) Date of Patent: Aug. 28, 2007

(54) METHOD FOR THE RECOVERY AND RECYCLE OF HELIUM AND CHLORINE

(75) Inventor: Arthur I. Shirley, Hillsborough, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 403 days.

(21) Appl. No.: 10/833,216

(22) Filed: Apr. 27, 2004

(65) Prior Publication Data

US 2005/0011353 A1    Jan. 20, 2005

Related U.S. Application Data

(60) Provisional application No. 60/487,989, filed on Jul. 17, 2003.

(51) Int. Cl.
 *B01D 53/22* (2006.01)
 *C03B 37/014* (2006.01)

(52) U.S. Cl. .................... 95/45; 95/53; 95/233; 65/454

(58) Field of Classification Search ............... 95/43, 95/45, 48, 53, 96, 127, 132, 149, 233; 65/454, 65/424, 426
See application file for complete search history.

(56) References Cited

U.S. PATENT DOCUMENTS

| | | | |
|---|---|---|---|
| 3,933,454 A | | 1/1976 | DeLuca |
| 5,055,121 A | | 10/1991 | Kanamori et al. |
| 5,452,583 A | * | 9/1995 | Schulte .......................... 62/63 |
| 5,890,376 A | | 4/1999 | Chludzinski |
| 6,063,162 A | * | 5/2000 | Orosz et al. ................... 95/182 |
| 6,092,391 A | | 7/2000 | Chludzinski |
| 6,152,986 A | * | 11/2000 | Foller ............................. 95/47 |
| 6,253,575 B1 | | 7/2001 | Chludzinski |
| 2001/0047722 A1 | * | 12/2001 | Volk ............................ 95/273 |
| 2002/0178913 A1 | | 12/2002 | Ji et al. |
| 2004/0040320 A1 | * | 3/2004 | Shedletsky et al. ........... 62/149 |
| 2004/0050094 A1 | * | 3/2004 | Thonnelier et al. ........... 62/617 |
| 2004/0237789 A1 | * | 12/2004 | Baksh et al. .................. 96/131 |

FOREIGN PATENT DOCUMENTS

| | | |
|---|---|---|
| EP | 1 104 891 A1 | 6/2001 |
| JP | 60 122741 A | 7/1985 |
| JP | 61 261223 A | 11/1986 |

OTHER PUBLICATIONS

Patent Abstracts of Japan, vol. 011, No. 124 (C-416), Apr. 17, 1987, for Japanese Patent JP 61 261223 A (Furukawa Electric Co Ltd.), Nov. 19, 1986, *abstract*.
Patent Abstracts of Japan, vol. 009, No. 278 (C-312), Nov. 6, 1985, for Japanese Patent JP 60 122741 A (Hitachi Cable Ltd.), Jul. 1, 1985, *abstract*.

* cited by examiner

*Primary Examiner*—Frank M. Lawrence
(74) *Attorney, Agent, or Firm*—Philip H. Von Neida

(57) ABSTRACT

Methods for recovering and recycling helium and unreacted chlorine from a process for manufacturing optical fiber are disclosed. Helium-rich and chlorine-rich gas streams are recovered from the consolidation furnace and separated. The helium-rich stream is dried and blended with make-up helium and the chlorine-rich stream is purified and blended with make-up chlorine so that each may be reused in the optical fiber production process.

21 Claims, 1 Drawing Sheet

METHOD FOR THE RECOVERY AND RECYCLE OF HELIUM AND CHLORINE

Figure 1:
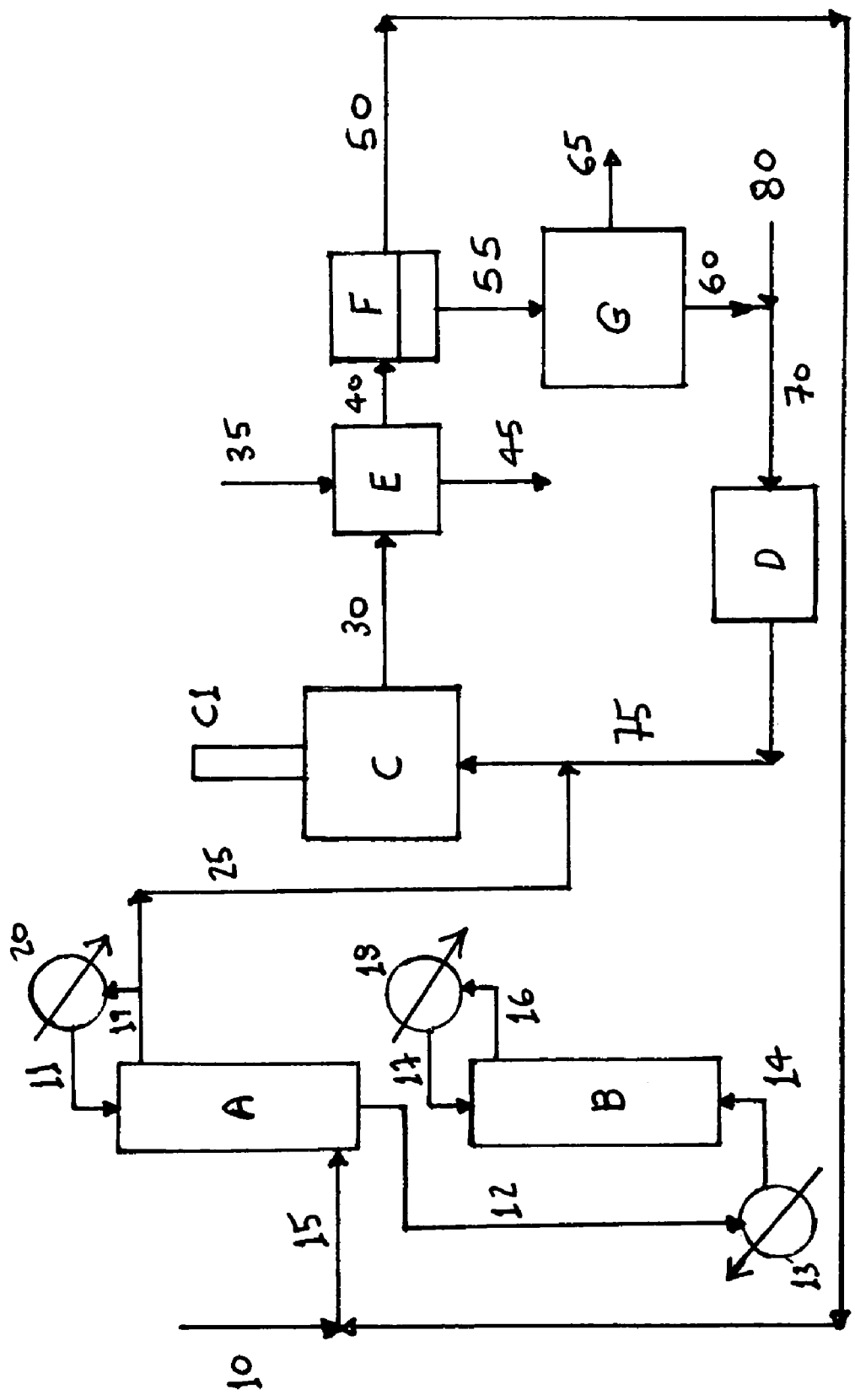

This application claims priority from U.S. Provisional Patent Application Ser. No. 60/487,989 filed Jul. 17, 2003.

BACKGROUND OF THE INVENTION

The present invention provides for a process for recovering and recycling helium and unreacted chlorine from the drying and consolidation of optical fiber preforms.

Optical fiber manufacturing is basically a two-phase process that involves fabrication of a specially constructed glass rod called a preform and then melting the preform and drawing it into a thin fiber. Preform fabrication normally involves two steps, deposition and consolidation, that may be combined as one continuous operation or split into two separate ones.

Helium gas has three primary uses in optical fiber manufacture, a carrier gas in preform deposition, a sweep gas in preform consolidation and a heat transfer medium for fiber drawing. Each of these three process steps introduces different impurities, contaminant levels and/or heat levels into the helium gas. The traditional once-through helium flows (i.e. entering the general gas waste stream) used in optical fiber manufacturing processes are wasteful and result in excessive consumption and unnecessarily high cost.

Other consolidation processes, such as disclosed in U.S. Pat. No. 5,055,121, for producing glass preform, has fluorine selectively added to its cladding for optical fiber. This can lower the refractive index of the quartz glass without affecting transmission characteristics of the optical fiber. The glass preform is produced by the steps of deposition of soot of quartz glass on a pipe; dehydration; and vitrification and addition of fluorine.

Dehydration gases include chlorine and chlorine-containing compounds such as $SOCl_2$ and $CCl_4$. In the vitrification and fluorine addition step, fluorine-containing gases such as $SF_6$, $CCl_2F_2$, $CF_4$, $C_2F_6$ and $SiF_4$ are employed. To obtain the transparent glass preform containing no residual bubbles, helium is the preferred carrier gas for both dehydration and fluorine-addition steps as it is easily dissolved in the glass. Table I summarizes the gas flow rates and concentrations used in the production of glass preform as per the example of the '121 patent.

TABLE I

| Dehydration | | Fluorine Addition | |
| --- | --- | --- | --- |
| $Cl_2$ | 0.6 l/min (6%) | $SiF_4$ | 0.3 l/min (3%) |
| He | 10 l/min (94%) | He | 10 l/min (97%) |

A considerable portion of the chlorine and fluorine-containing gases may leave this process untreated and are currently abated by scrubbing with an alkaline solution. The helium exiting the process is released into the atmosphere. Helium is a non-renewable gas and is expensive. As such, it is highly desirable to recover and recycle the helium to reduce the cost of optical glass fiber production. The recovery of chlorine is desirable from both a cost aspect and an environmental one as well.

SUMMARY OF THE INVENTION

The present invention provides for means for recovering helium and unreacted chlorine from optical fiber preform drying and consolidation processes. The off-gas from one or more consolidation furnaces is collected, water-washed to remove the majority of HCl byproduct and separated into chlorine-rich and helium-rich streams utilizing a selectively-permeable membrane or other gas separation technique. The chlorine-rich stream, along with make-up low purity industrial chlorine, is sent to a distillation process unit to be purified to high purity for reuse in the consolidation furnace. The helium-rich stream is dried utilizing a membrane or adsorption dryer and blended with make-up helium for reuse in the consolidation furnace or in another process in optical fiber manufacture.

In one embodiment the present invention provides for an improved method for production of an optical fiber from a preform including a drying step and a consolidation step wherein helium and chlorine are present in the exhaust gas stream formed during the production, the improvement comprising recovering helium and chlorine from the exhaust gas stream.

In an alternative embodiment, the present invention comprises a method for the production of optical fiber wherein the fiber is cooled during production by a gas stream comprising helium and chlorine comprising recovering the helium and chlorine from the gas stream.

Alternatively, the present invention provides for a method for recovering helium and chlorine from a consolidation furnace in a fiber optical manufacturing process comprising the steps:

(a) drawing the fiber through the consolidation furnace;
(b) adding helium to the consolidation furnace;
(c) adding chlorine to the consolidation furnace;
(d) withdrawing an exhaust gas from the top of the furnace wherein the exhaust gas comprises helium and chlorine;
(e) feeding the exhaust gas to a water wash column to remove hydrochloric acid; and
(f) feeding the exhaust gas to a separation device thereby forming a helium-rich stream and a chlorine-rich stream.

The present invention also provides for a method for recovering and recycling chlorine from a consolidation furnace in a fiber optical manufacturing process comprising the steps:

(a) drawing the fiber through the consolidation furnace;
(b) adding helium to the consolidation furnace;
(c) adding chlorine to the consolidation furnace;
(d) withdrawing an exhaust gas from the top of the furnace wherein the exhaust gas comprises helium and chlorine;
(e) feeding the exhaust gas to a water wash column to remove hydrochloric acid;
(f) feeding the exhaust gas to a separation device thereby forming a helium-rich stream and a chlorine-rich stream; and
(g) feeding the chlorine-rich stream into the consolidation furnace.

DETAILED DESCRIPTION OF THE INVENTION

The present invention provides for a method for recovering helium and unreacted chlorine from optical fiber preform drying and consolidation processes employed in the manufacture of optical fiber.

The stages in an optical fiber consolidation process may include purge with nitrogen, dehydration with chlorine/ helium gas; vitrification with a nitrogen/helium gas mixture; and addition of fluorine with helium/fluorine containing gas mixture.

In a typical process for the recovery of helium from preform drying and consolidation, the exhaust gas mixture exiting the consolidation furnace comprises He, $Cl_2$, HCl, $N_2$, $O_2$, $H_2O$, and fluorine-containing gas.

Typically, the preform will complete the above steps in the furnace. The top of the furnace is partially open and the process gases as noted enter the furnace at the bottom and exit near the top. Large amounts of air are sucked into the exhaust stream which is carried to the blower or the vacuum pump.

In one embodiment of the present invention, high purity chlorine is manufactured from a low-purity chlorine source, such as industrial chlorine, via a distillation process unit. Gaseous ultra high purity (UHP) chlorine, 99.9999% $Cl_2$, from the distillation unit is mixed with helium in a ratio of about 1:10 to about 1:100 $Cl_2$:He and fed to a consolidation furnace housing a glass deposition preform.

$Cl_2$ permeates the unconsolidated preform and reacts with entrained—OH groups in the glass to form HCl, which is carried from the glass matrix by the helium gas. Only a small portion of the chlorine reacts, perhaps 75 to 80% so the effluent or off-gas from the consolidation furnace contains mostly helium and chlorine, with small amounts of HCl and moisture, and even smaller amounts of $SiCl_4$, $SiO_2$, $O_2$, $N_2$ and trace amounts of other compounds.

To recover the chlorine and helium from this off-gas, the stream is collected, perhaps via a vacuum pump, and then sparged through a water wash column to remove HCl. The vapor of the wash column is fed to a gas separation device, such as a selectively permeable membrane, that separates a He-rich stream from a $Cl_2$-rich stream. This He-rich stream, containing perhaps a small amount of moisture is compressed and fed to a dryer that restores the gas to a high-purity, specifically with respect to moisture. Make-up helium is added to this reclaimed stream and recycled back to the consolidation furnace or furnaces.

The $Cl_2$-rich stream which comprises greater than 95% $Cl_2$ is fed back to the distillation unit where a make-up stream of industrial chlorine is added and the mixture is fed into the distillation unit for purification. In this way, both chlorine and helium are reused within the optical fiber making process.

Turning now to the figure, industrial strength chlorine is fed into line 10 and connects to line 15 which enters a first distillation column A. The bottoms from said column leave via line 12 and pass through heat exchanger 13 to line 14 and into the bottom of the second distillation column B. The tops of this column exit through line 16 and pass through heat exchanger 18 and back into column B through line 17.

The chlorine which is present in distillation column A will leave through the top of the column through line 25. This chlorine which has been purified to 99.9999% chlorine by weight will travel to line 75 and on into the consolidation furnace C. Part of the gas stream leaving column A will bypass to line 19 through heat exchanger 20 and re-enter the top of column A through line 11.

The chlorine gas which has been transferred to line 75 will mix with helium gas for entry into the consolidation furnace C. The preform is noted at the top of the column and is designated C1. The chlorine gas will exit the consolidation furnace C through line 30. Typically a blower or vacuum pump (not shown) is employed in removing the gas from the consolidation furnace. The chlorine gas is now part of a larger mixture of helium, chlorine, water, nitrogen, oxygen and hydrochloric acid all of which comprise the exhaust gas from the fiber optic production process. These other gases, notably water, nitrogen, oxygen and hydrochloric acid are impurities that either enter the consolidation furnace or are by-products of the fiber optic production method.

This exhaust gas stream enters wash column E which is fed with fresh water through line 35. The wash column is designed to react with and remove the hydrochloric acid present in the exhaust gas stream. The wash water which contains certain of the impurities scrubbed from the exhaust gas stream is removed from the wash column via line 45 to a scrubber unit whereby the water may be cleaned up and used in other processes.

The exhaust gas stream which now contains mostly helium, chlorine, water, nitrogen and oxygen leaves the wash column E through line 40 and is directed in this figure to a membrane unit F. Other gas separation systems can be employed such as temperature swing adsorption (TSA) and pressure swing adsorption (PSA) but preferably the gas separation system is a membrane unit. The membrane unit comprises a selective permeable membrane which will allow certain gases to pass through while stopping others. In this instance the helium and water from the exhaust gas stream will leave the membrane unit through line 55 and enter dryer G. The dryer will selectively remove water from this mixture and some helium and this mixture will leave through line 65 which can be a vent to the atmosphere.

The majority of the helium will leave the dryer G through line 60 whereby it will join with pure makeup helium from line 80 and pass through line 70 to a compressor D. This combination of recycled helium and makeup helium will then be sent via line 75 back to the consolidation furnace allowing for a steady state operation of the fiber optic production process.

The remainder of the exhaust gas stream which now consists of chlorine, some hydrochloric acid, nitrogen and oxygen will leave the membrane unit F through line 50 and be directed back to the point where the industrial strength chlorine is directed to the distillation column A and both streams will enter the column through line 15 whereby the chlorine will be purified and will be fed to the consolidation furnace.

As indicated above, the gas separation unit can be any appropriate gas purification unit such as a pressure swing adsorption (PSA) system. It may comprise a single adsorption unit or a battery of adsorption units operated in phase or a plurality of adsorption units or batteries of adsorption units operated out of phase, whichever is desired. When a system comprising a single adsorption unit or battery of units all of which are operated in phase is used, the adsorption step must be periodically stopped to permit regeneration of the adsorbent beds, whereas when a plurality of adsorption units are employed in parallel and operated out of phase, one or more units can be an adsorption surface adsorbing impurities while one or more other units are undergoing regeneration to desorb the impurities.

Operation of the adsorption systems of the invention is cyclical. In the preferred adsorption process, cycles are repeatedly carried out in a manner such that production of the purified helium is substantially continuous.

In a PSA system, the adsorption vessels are packed with an appropriate adsorbent and particulate form. Suitable adsorbents for the adsorption of nitrogen and oxygen includes zeolites such as zeolite 4A, zeolite 5A and zeolite 13X and carbon molecular sieves. In particular, adsorbents used in the adsorption process is a matter of choice and will be dictated in part by the nature of the impurities encountered in the coolant gas stream. The adsorption vessels desirably contain a pre-purification layer, desiccants such as activated alumina or silica gel to remove water vapor contained in atmospheric air. Activated alumina is a preferred desiccant since it also serves to remove carbon dioxide from the air thereby reducing or eliminating the adsorption of carbon dioxide by the principal adsorbent. Alternatively, the system may contain a separate air pre-purification unit to remove water vapor and carbon dioxide from the feed gas prior to its introduction into the adsorption vessels.

The temperature and pressure at which the PSA process is carried out are matters of choice and not critical. In general, the adsorbent process may be carried at temperatures in the range of about −50 to about 100° C. but are generally carried out at temperatures in the range of about 0 to about 40° C. Typically, the adsorption is carried out at a pressure at or above about 1 bara. The minimum pressure at which the adsorption step is carried out is preferably about 2 and most preferably about 5 bara. The upper pressure limit is determined by economics and limitations of the adsorption system and in general it is desirably about 50 bara, preferably about 20 bara and most preferably about 15 bara.

The pressure at which adsorbent regeneration is carried out is likewise a matter of choice and the minimum pressure depends upon whether or not vacuum equipment is used to withdraw adsorbed gases from these vessels. Typically, the lower pressure limit during adsorbent regeneration of these vessels can be as low as 50 millibara but it is preferably not lower than about 150 millibara and it is most preferably not lower than about 200 millibara. Adsorbent regeneration may be carried out at pressures as high as 5 bara but is preferably carried out at pressures not higher than about 2 bara and most preferably at pressures not above 1 bara.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit of the present invention.

Having thus described the invention, what I claim is:

1. An improved method for production in a consolidation furnace of an optical fiber from a preform including a drying step and a consolidation step wherein helium and chlorine are present in the exhaust gas stream formed during said production, the improvement comprising recovering helium and chlorine from said exhaust gas stream and recycling said helium and said chlorine back to said consolidation furnace.

2. The method as claimed in claim 1 comprising removing hydrochloric acid from the exhaust gas stream.

3. The method as claimed in claim 1 wherein said exhaust gas stream is separated into a helium-rich gas stream and a chlorine-rich gas stream.

4. The method as claimed in claim 3 wherein said separation is performed with a separation device selected from the group consisting of a selectively permeable membrane, a temperature swing adsorption unit and a pressure swing adsorption unit.

5. The method as claimed in claim 1 comprising adding make up helium to said recycled helium-rich gas stream.

6. The method as claimed in claim 1 comprising adding make up chlorine to said recycled chlorine-rich gas stream.

7. The method as claimed in claim 1 wherein the ratio of chlorine to helium in said consolidation furnace is about 1 to 10 to about 1 to 100 by weight.

8. A method for the production in a consolidation furnace of optical fiber wherein said fiber is cooled during production by a gas stream comprising helium and chlorine comprising recovering said helium and chlorine from said gas stream.

9. The method as claimed in claim 8 wherein the ratio of chlorine to helium in said consolidation furnace is about 1 to 10 to about 1 to 100 by weight.

10. The method as claimed in claim 8 wherein hydrochloric acid is removed from said gas stream.

11. The method as claimed in claim 8 wherein said gas stream is separated by a process selected from the group consisting of a selectively permeable membrane, a temperature swing adsorption unit and a pressure swing adsorption unit.

12. The method as claimed in claim 11 wherein said exhaust gas stream is separated into a helium-rich gas stream and a chlorine-rich gas stream.

13. The method as claimed in claim 12 comprising recycling said helium-rich gas stream back to said consolidation furnace.

14. The method as claimed in claim 13 comprising adding make up helium to said recycled helium-rich gas stream.

15. The method as claimed in claim 12 comprising recycling said chlorine-rich gas stream back to said consolidation furnace.

16. The method as claimed in claim 15 comprising adding make up chlorine to said recycled chlorine-rich gas stream.

17. A method for recovering helium and chlorine from a consolidation furnace in a fiber optical manufacturing process comprising the steps:
(a) drawing said fiber through said consolidation furnace;
(b) adding helium to said consolidation furnace;
(c) adding chlorine to said consolidation furnace;
(d) withdrawing an exhaust gas from the top of said furnace wherein said exhaust gas comprises helium and chlorine;
(e) feeding said exhaust gas to a water wash column to remove hydrochloric acid; and
(f) feeding said exhaust gas to a separation device thereby forming a helium-rich stream and a chlorine-rich stream.

18. The method as claimed in claim 17 wherein said separation device is selected from the group consisting of a selectively permeable membrane, a temperature swing adsorption unit and a pressure swing adsorption unit.

19. The method as claimed in claim 17 further comprising recycling said chlorine-rich stream to said consolidation furnace.

20. The method as claimed in claim 17 further comprising recycling said helium-rich stream to said consolidation furnace.

21. A method for recovering and recycling chlorine from a consolidation furnace in a fiber optical manufacturing process comprising the steps:
(a) drawing said fiber through said consolidation furnace;
(b) adding helium to said consolidation furnace;
(c) adding chlorine to said consolidation furnace;
(d) withdrawing an exhaust gas from the top of said furnace wherein said exhaust gas comprises helium and chlorine;
(e) feeding said exhaust gas to a water wash column to remove hydrochloric acid;
(f) feeding said exhaust gas to a separation device thereby forming a helium-rich stream and a chlorine-rich stream; and
(g) feeding said chlorine-rich stream into said consolidation furnace.

* * * * *